US007565225B2

(12) United States Patent
Dushane et al.

(10) Patent No.: US 7,565,225 B2
(45) Date of Patent: Jul. 21, 2009

(54) ENVIRONMENT, LIGHTING AND SECURITY CONTROL SYSTEM (75) Inventors: Steven Dushane, Granada Hills, CA (US); Craig Godwin, Eugene, OR (US); Stephen Tudhope, Ventura, CA (US); Richard Russo, Simi Valley, CA (US); Mustafa Oransel, Northridge, CA (US)

(73) Assignee: Venstar, Inc., Chatsworth, CA (US)

( * ) Notice: Subject to any disclaimer, the term of this patent is extended or adjusted under 35 U.S.C. 154(b) by 181 days.

(21) Appl. No.: 11/775,138

(22) Filed: Jul. 9, 2007

(65) Prior Publication Data

US 2009/0018673 A1 Jan. 15, 2009

(51) Int. Cl.
*G05D 23/00* (2006.01)
*G01M 1/38* (2006.01)
*G05B 13/00* (2006.01)

(52) U.S. Cl. .......................... 700/276; 700/76
(58) Field of Classification Search ............... 700/2–5, 700/9, 10, 17–20, 75, 76, 83, 84, 275–278, 700/299, 300; 709/208–211
See application file for complete search history.

(56) References Cited

U.S. PATENT DOCUMENTS

| 4,212,078 | A | * | 7/1980 | Games et al. ................. 700/2 |
| 4,657,179 | A | * | 4/1987 | Aggers et al. ................. 236/51 |
| 4,847,781 | A | | 7/1989 | Brown, III et al. |
| 4,874,926 | A | * | 10/1989 | Sanders ...................... 219/486 |
| 4,918,615 | A | | 4/1990 | Suzuki et al. |
| 4,964,058 | A | * | 10/1990 | Brown, Jr. .................... 700/296 |
| 5,279,458 | A | * | 1/1994 | DeWolf et al. ................. 236/47 |
| 5,544,036 | A | | 8/1996 | Brown, Jr. et al. |
| 5,798,945 | A | | 8/1998 | Benda |
| 6,216,956 | B1 | * | 4/2001 | Ehlers et al. .................. 236/47 |
| 6,772,049 | B2 | * | 8/2004 | Choi .......................... 700/277 |
| 7,142,112 | B2 | * | 11/2006 | Buckingham et al. ...... 340/545.1 |
| 2002/0152298 | A1 | * | 10/2002 | Kikta et al. .................. 709/223 |
| 2006/0038672 | A1 | * | 2/2006 | Schoettle .................... 340/522 |
| 2006/0106499 | A1 | * | 5/2006 | Roosli et al. ................. 700/276 |
| 2008/0069121 | A1 | * | 3/2008 | Adamson et al. ............ 370/401 |
| 2008/0281472 | A1 | * | 11/2008 | Podgorny et al. ........... 700/276 |

* cited by examiner

*Primary Examiner*—M. N. Von Buhr (57) ABSTRACT

The present invention provides an environment measurement monitoring and response system. The present invention provides a method, system and program for managing multiple environmental systems in retail store locations geographically remote from each other.

14 Claims, 5 Drawing Sheets

ENVIRONMENT, LIGHTING AND SECURITY CONTROL SYSTEM

FIELD OF THE INVENTION

The present invention relates to a system of information, control and maintenance responses for commercial stores separated by great distances via communication over a worldwide computer network, especially for those commercial location data, functions and equipment related to environmental, security and lighting controls.

BACKGROUND

Most successful (and even unsuccessful) commercial retail businesses operate from multiple retail store locations. Such store locations are typically separated from other stores by great distances, sometimes operating in different states, regions, or countries. Each store location operates to maximize business revenue and profit through ever-improving customer relationships, numbers and purchasing. However, retail stores incur substantial overhead costs in order to provide an environment suited to inducing customer purchasing and satisfaction. To accommodate their customers, retail stores control the environmental conditions within customer occupied spaces in their stores with the goal of minimizing costs. For each location, information and control systems for heating, air conditioning, lighting, humidity control, security, and emergency responses with their associated environmental control equipment ("environmental system") are operated to reach customer requirements while minimizing operating costs. These environment systems are rarely standardized among multiple store locations due to variations in local requirements, preferences at the time of construction, and other such decisions.

Retail stores of a single business entity often have very different cross sections of a community for customers even between closely located store locations. Where store locations are separated by tens or hundreds of miles, culture and weather interact to create customer expectations of a store's environment that are very different between such separated stores. Environmental systems for commercial retail stores most often include an integrated collection of devices that monitor and affect the environment of a facility or building, including heating, venting, and cooling ("HVAC") equipment. Devices that monitor the environment include sensors for temperature, light, gas components, motion detection, humidity, air flow, and smoke, among others, which measure ambient or local levels of an environmental condition and transmit the sensed level to a receiver which stores, acts upon or further transmits the sensed level. Devices that affect the environment, such as heating and cooling equipment, lights, humidifiers, and the like, comprise switches to operate or turn off such equipment. Programmable thermostats or remotely connected computers are often used to receive sensor levels and control equipment that affects the local environment. Environmental systems for multiple retail store locations cumulatively includes a substantial number of environmental control equipment and sensors, often comprising many different makes and models of each type of sensor and environmental control equipment.

In the case of large, local industrial facilities, control systems can comprise one or more programmed computers to process and utilize the information received from the sensors to remotely control the controlled devices (See U.S. Pat. No. 5,793,646). The control systems regulate environmental conditions such as ambient temperature and humidity, and energy consumption and may monitor and control lighting, refrigeration, and other energy consuming equipment. According to prior art systems, a computer-based control system of a large scale system must be accessible by local building management personnel in order to allow adjustment of environmental parameters. Environmental parameters include the desired ambient conditions of a facility such as, for example, the desired nighttime and daytime ambient temperature. To this end, the control system is typically provided with user interface software that allows the building management personnel to query measured conditions, query controlled device status, and alter system parameters.

The model of environmental control for local, large facilities is not immediately adaptable to a separated set of retail stores operated by a single business entity. The control of an environmental system at a store location is significantly affected at an instantaneous end of the spectrum by expressed and/or obvious customer needs from present store environmental conditions and at a very long range end of the spectrum to energy management and equipment preservation goals of the business entity owning multiple store locations. Large scale industrial facilities do not have to adapt their control systems for many of the requirements experienced by retail stores.

In addition, geographically remote store locations experience wide variations in external temperature, lighting, and other environmental conditions at the same time of year. For example, a company may through remote, centralized computer network control from its corporate offices send setpoint control signals to local store thermostats such that store heating equipment starts operating when temperatures fall to 75 degrees F. and that store air conditioning start operating when store temperatures rise to 80 degrees F. during the hours each store is open. Such a system eliminates local control in deference to geographically distant decisionmakers who do not view or interact with customers in the store at the critical times of their entry into a store and when they decide to purchase a product or service.

Conventional electronic sensors also include those devices that measure conditions of equipment in the environmental system. Such sensors can translate into electronic signals such aspects as vibration, instantaneous and summation of operating time periods for equipment or portions thereof (such as fans, compressors, smoke detectors, etc.), views or images of certain aspects of the equipment and customer occupied spaces of a retail store. Retail stores, unlike large industrial locations, do not employ maintenance personnel for environmental systems at their store location because of the infrequent times such maintenance is needed. Typically, a local manager or central corporate office will arrange with a local maintenance service provider to respond to requests from the local manager to first inspect the environmental system for problems and then repair or replace malfunctioning equipment if that action is needed.

An electronic environmental measurement device is able to translate a measurement, such as the speed of a propeller driven by air flow, into a numerical output. Numbers computed by calibrated electronic environmental measurement devices are associated with a scale of measurement that has been assigned to that type of environmental measurement. An individual may be able to consult a chart or other documentation to discern the meaning and/or implication of the computed number. For example, a computed air flow from an air conditioner condenser may be compared by an individual with a chart containing advisories based on a range of wind speeds. While conventional environmental measurement devices provide a computed number that can be utilized by an individual or group to monitor a particular portion of the environment system, there is a need for electronically documenting the measured data in a timely manner in that to electronically documents data from multiple diverse electronic environmental measurement devices such that a comprehensive environmental system profile can be determined. For example, while an individual may be able to consult a chart or other textual data to discern the meaning of a number computed by an electronic environmental measurement device or sensor, this data is not always available, may not be current, may not provide recommendations for how to respond to particular measurement values, and may not provide analysis of measurements from multiple diverse electronic environmental measurement devices.

SUMMARY OF THE INVENTION

In view of the foregoing, it is therefore an object of the present invention to provide an improved environment measurement monitoring device. It is another object of the present invention to provide an improved method, system and program for monitoring and managing an environmental system. It is yet another object of the present invention to provide an improved method, system and program for managing multiple environmental systems in retail store locations geographically remote from each other.

According to the present invention, two or more retail store locations are sensor signals from a particular environment are converted into a common transmittable data format, wherein each of the environment indicators is computed by an electronic environment measurement device from among multiple diverse electronic environment measurement devices. The environment indicators are transmitted in the transmittable data format to a universally accessible server system in association with a particular universal identifier for a particular user. The universally accessible server system analyzes each of the environment indicators according to an environment sensitivity profile stored within the universally accessible server system in association with the universal identifier. Control signals are determined at the universally accessible server system for adjusting multiple environment control systems that control the particular environment in response to the analysis. The particular environment is adjusted as controlled by the environment control systems according to the control signals, such that a particular environment is temporarily managed via a universally accessible server system according to an environment sensitivity profile associated with a particular user.

DETAILED DESCRIPTION OF THE INVENTION

The invention is now discussed with reference to the figures.

Figure 1:
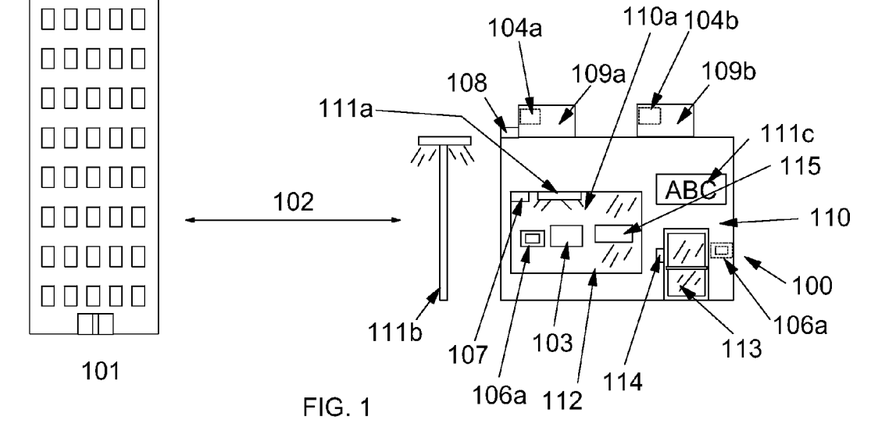
FIG. 1 is a schematic view of a central corporate office effectively in communication with one of several retail store locations.
Figure 2:
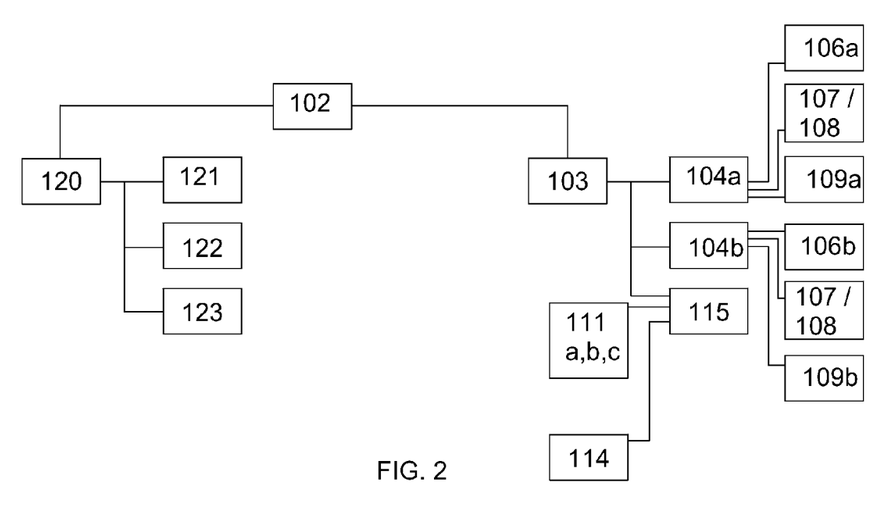
FIG. 2 is a block diagram view of the environmental, security and lighting systems of the store of FIG. 1 as effectively communicating with the corporate office of FIG. 1.

FIG. 1 shows a central corporate office 101 comprising corporate server 120 (as in FIG. 2). Computer server means 120 further comprise personal computer nodes 121 through 123, which nodes 121 through 123 are equipped with input/output devices such as monitors, keyboards, and the like for operation of central monitoring and control software operating via server 120 and nodes 121 to 123 to accomplish the objects of the invention. Server 120 communicates by wide area network connection 102 (preferably via Internet servers and links) to one or more retail store locations 100.

A store location comprises a structure 110 enclosing a conditioned space 110a, where large pane glass 112 provides a view from the exterior of structure 110 into conditioned space 110a so that passing customers are able to observe advertising and/or products available at location 100. Two sets of heating, ventilation and air conditioning ("HVAC") equipment 109a and 109b, respectively, are enclosed individual housings on a rooftop of structure 110. Multiple sets of HVAC equipment are common in a commercial building due to the large amount of conditioned space in the building, where each of such sets of HVAC equipment will heat or cool a zone of the conditioned space 110a. It is well known in the art that the local zone temperature sensed by a temperature sensor in that zone is transmitted to a programmable thermostat which compares the local temperature to a setpoint to determine to operate or shut down the HVAC equipment for that zone. The programmable thermostat is conventionally located in that zone and bears the local temperature sensor in its housing.

Referring to FIGS. 1 and 2, computer server means 120 bi-directionally communicate through network connection 102 with data concentrator 103. Data concentrator 103 is analogous to a local network server, in that it preferably comprises input/output means including a local RS485 bus. The RS485 bus is provided with local ports with which to establish bi-directional communication between the data concentrator 103 and equipment control packages 104a and 104b and lighting and security control package 115. In general, equipment control packages 104a and 104b monitor and control environmental conditions in the conditioned space 110a and lighting and security control package 115 monitors and controls lighting and security inside and outside of structure 110. Providing this distribution of discretely housed circuits, switches and associated equipment enables the user to quickly integrate and remotely monitor and control the environmental, lighting and security aspects of location 100, as well as providing backup local monitoring and control for those functions.

In a departure from the prior art, equipment control packages ("ECP") 104a and 104b are installed within the housings of HVAC equipment 109a and 109b respectively. Such ECP's 104a and 104b are effectively in bidirectional communication respectively with controlled programmable thermostats 106a and 106b (shown in broken lines in FIG. 1 indicating its location in another zone in conditioned space 110a apart form thermostat 106a). Such effective, bidirectional communication is shown in FIG. 2. Locating the multi-function ECP's within the housing of the HVAC equipment dramatically expands the potential capacity of the entire system for future changes in HVAC equipment and changes in equipment and software for the ECP's. The ECP's comprise control programs for HVAC equipment and input/output means that have conventionally been operated in and located in wall mounted programmable thermostats in a conditioned space. Each ECP is in communication with a programmable thermostat whose control functions for the HVAC equipment are over-ridden in normal operation of the ECP, although short periods of HVAC equipment control are permitted via a push button interface at controlled programmable thermostats 106a and/or 106b.

Placing the ECP's at or next to the housing of HVAC equipment dramatically reduces wiring associated with HVAC control and monitoring. Controlled programmable thermostats 106a and 106b each preferably comprise a temperature sensor so that zone installation eliminates the need for a separately wired temperature sensor to each zone. It is critical that HVAC equipment be monitored for maintenance and energy savings programs with locally installed sensors on and about the HVAC equipment. Such other sensors include the approximate coolant temperature between the compressor outlet and the condenser inlet and between the evaporator coil outlet and the compressor inlet. Other sensors include one measuring cooled air flow out of the evaporator coil and the filters and the temperatures of the return and supply air flows.

Lighting and security control package ("LSCP") 115 is preferably installed within the structure 110 of location 100. Such an LSCP 115 is effectively in bi-directional communication respectively with data concentrator 103. Such effective, bi-directional communication is shown in FIG. 2. LSCP 115 also communicates with sensors and lighting and security equipment for monitoring and controlling such equipment. Segregating lighting and security monitoring and control functions in the LSCP 115 as a discretely housed package of circuits, switches, and other equipment permits rapid installation and integration of those functions for remote monitoring and control at the corporate office 101 via communication through network 102. The physical segregation of functions and communications to LSCP 115 has been found to dramatically simplify wiring associated with its controlled equipment and associated sensors in a manner that allows for very distant monitoring and control. Because of their closely associated operations and locations, lighting and security devices often have closely associated power wiring in commercial structures. Bringing switches for those devices within the housing of the LSCP 115 eliminates the cost and redundancy of separate housings and control means.

The present invention in one embodiment locates a housing for monitoring and control means for HVAC functions in a substantially different location than a housing for monitoring and control means for lighting and security at a commercial structure, where a separated housed data concentrator controls communications with system information displays at and control inputs from a geographically remote corporate office, although the data concentrator can be accessible via any Internet connection upon entry of security access codes to the data concentrator. A central control program at the corporate office gathers information from multiple locations and provides means for imposing a single set of limitations and operating parameters on the HVAC, lighting, and/or security systems with a single input action.

Internal sensors 107 are shown in FIG. 1 as being located in conditioned space 110a. External sensors 108 are shown in FIG. 1 as external to the walls and or roof of structure 110.

For an ECP 106, internal sensors 107 comprise temperature sensors placed at least in a zone of the conditioned space 110a whose temperature or other environmental conditions are controlled by said ECP 106. Said temperature sensors sense local, ambient, indoor temperature and to transmit electrical signals representing such temperatures. Internal sensors 107 for an ECP 106 in alternate embodiments may comprise humidity sensors, sensors for smoke, carbon dioxide, or carbon monoxide, motion sensors detecting occupancy of the conditioned space 110a. For an LSCP 115, internal sensors 107 comprise motion sensors detecting occupancy of the conditioned space 110a, light sensors capable of measuring detecting ambient indoor lighting, and sensors that detect the opening or closing of a door 113 (FIG. 1). LSCP 115 may bear a user interface with push buttons and means for effecting switch inputs for controlled equipment.

Figure 3:
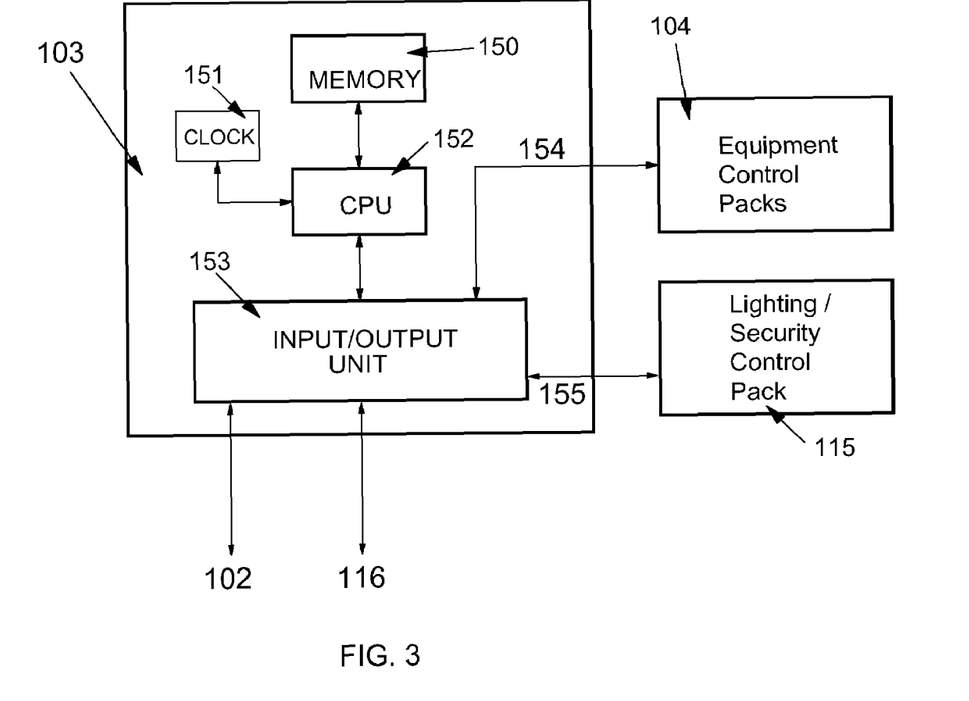
FIG. 3 is a block diagram of a data concentrator as in FIG. 1.

Referring now to FIG. 3, data concentrator 103 comprises a central processing unit 152 connected to memory 150 and clock 151 for operation thereby of a data concentrator control program for actuation via connection with input/output unit 153. In a preferred embodiment, I/O unit 153 includes an RS485 bus and connection ports for wired connection to network connection 102, a local PC 116, ECP's 104 (via link 154), and LSCP 115 (via link 155). The memory 150 of data concentrator 103 stores control parameters for its operation to facilitate communication between the local ECP's and LSCP's and the corporate server 120, including storage of identity addresses of those system nodes and temporary or permanent storage of communications between said nodes.

Figure 4:
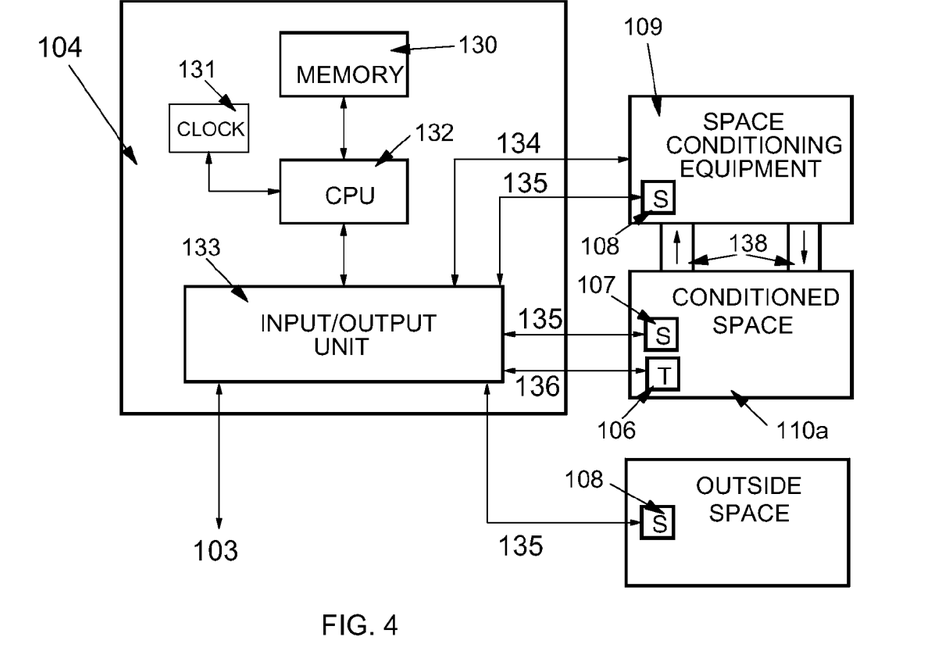
FIG. 4 is a block diagram of an equipment control package as in FIG. 1.

Referring now to FIG. 4, ECP 104 comprises a central processing unit 132 connected to memory 130 and clock 131 for operation thereby of an ECP control program for actuation via connection with input/output unit 133. In a preferred embodiment, I/O unit 133 includes an RS485 connection port for a wired connection to data concentrator 103. I/O unit 133 includes means for wired connections 134 to HVAC equipment 109 for control thereof, wired connections 135 to sensors 107 and 108, and connection 136 to thermostat 106. Memory 130 stores sensor data values received by ECP 104 that are additionally associated with specifically addressed sensors and particular times and dates, setpoints for comparison with said sensor data values so that the ECP control program operates to control HVAC equipment 109, periods of operation of individually addressed items of equipment of HVAC equipment 109 for calculation of energy consumption of each piece of equipment, and other such data.

Figure 5:
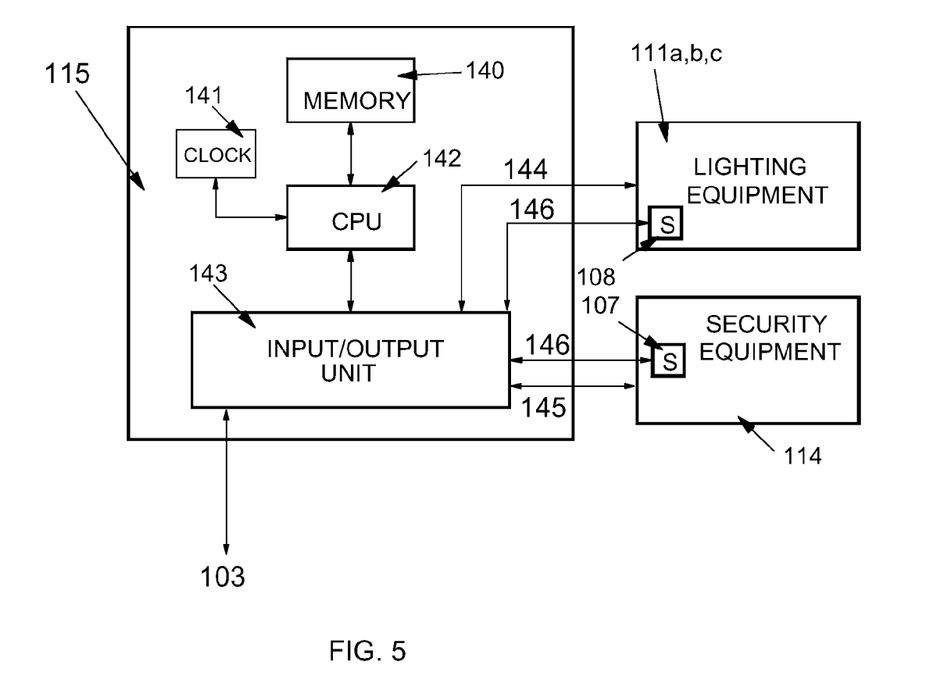
FIG. 5 is a block diagram of a lighting and security control package as in FIG. 1.

Referring now to FIG. 5, LSCP 115 comprises a central processing unit 142 connected to memory 140 and clock 141 for operation thereby of an LSCP control program for actuation via connection with input/output unit 143. In a preferred embodiment, I/O unit 143 includes an RS485 connection port for a wired connection to data concentrator 103. I/O unit 143 includes means for wired connections 144 to lighting equipment 111a,b,c for control thereof, wired connections 145 to security equipment 114 for control thereof, and wired connections 146 to sensors 107 and 108. Security equipment 114 comprises alarms, door locks, and other means for securing a commercial building. Memory 140 stores sensor data values received by LSCP 115 that are additionally associated with specifically addressed sensors and particular times and dates, setpoints for comparison with said sensor data values so that the LSCP control program operates to control zones of lighting equipment 111 (i.e., as in zones for 111a, 111b or 111c) or security equipment 114, periods of operation of individually addressed items of equipment of lighting equipment 111 or security equipment 114 for calculation of energy consumption of each piece of equipment, and other such data. FIG. 1 shows three separately controlled zones of lighting for location 100. A first zone of lighting equipment 111a is the interior lights of structure 110. A second zone of lighting equipment 111b is the outside illumination lights for location 100. A third zone of lighting equipment 111c is signage lighting. Each of these zones of lighting operate independent of the other zones of lighting under the control of the LSCP control program.

Figure 6:
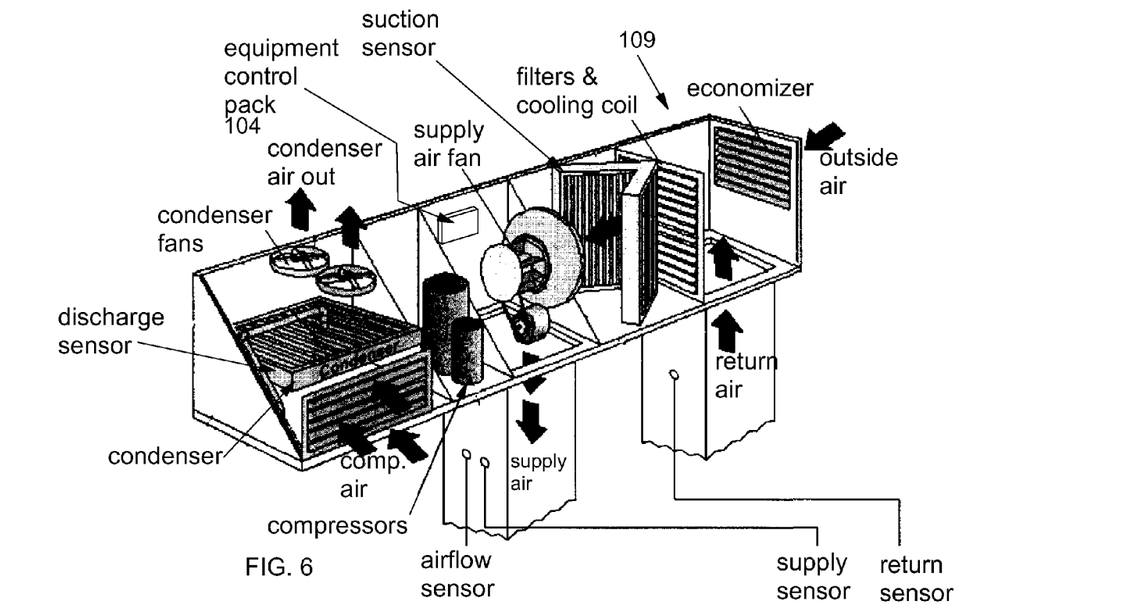
FIG. 6 is a perspective view of roof-top HVAC equipment including sensors and an equipment control package as in FIG. 1 installed in its housing according to a specific embodiment of the invention.

FIG. 6 is a cutaway housing view perspectively showing HVAC equipment 109 as a typical roof mounted air conditioning unit with compressors, cooling coil, condenser, condenser fans, supply air fan, filters, economizer and supply and return air ducts. The housing is shown with an ECP 104 unit installed next to the supply air fan, although it may be located outside the housing as well. Outside sensors 108 connected with ECP 104 include the sensors for supply air flow and temperature, return temperature, compressor discharge coolant temperature, and compressor suction coolant temperature. It is instantly appreciated that the wiring between the sensors 108 and ECP 104 is very short. It is preferred that ECP 104 be housed in a hermetically sealed unit capable of being opened for maintenance or upgrades to its microprocessor components, which components comprise features such as printed circuit boards, cable ports and connections to logic elements, sensor input ports, switches and relays for turning on and off HVAC equipment. The engineering to create a sealed package of such equipment is within skill in the art upon disclosure of the present specification and drawings.

Figure 7:
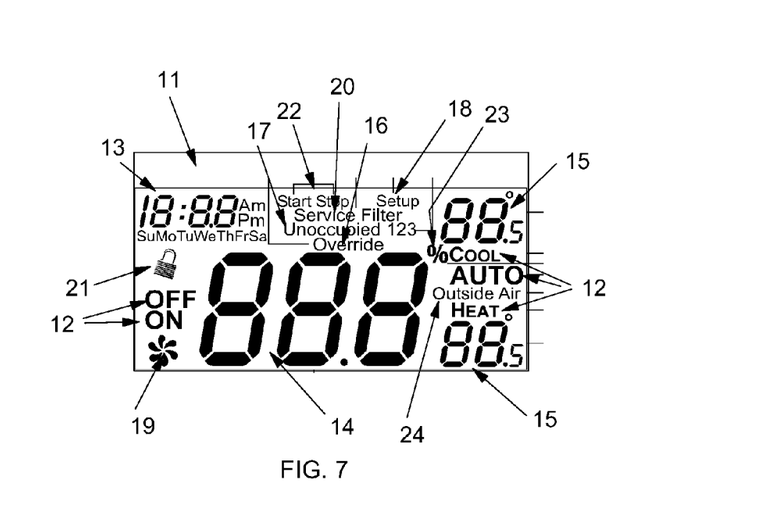
FIG. 7 is a pictorial representation of a preferred thermostat to be effectively connected with an equipment control package as in FIG. 1.

FIG. 7 is an exemplary pictorial of a liquid crystal display of a controlled programmable thermostat 106. Thermostat 106 is supported in a housing on a wall in the conditioned space 110a and encloses a microprocessor comprising a clock, memory, and CPU, the CPU being connected to an input/output unit that includes user push buttons and said liquid crystal display facilitating operation of a thermostat control program. The pictorial of FIG. 7 shows that the thermostat control program is capable of operating to receive sensor inputs and thereafter displaying the following:

Equipment Operation Mode Indicators 12:
HEAT—indicates the heat mode of HVAC equipment 109.
COOL—indicates the air conditioning mode of HVAC equipment 109.
AUTO—indicates the system will automatically changeover between heat and cool modes for HVAC equipment 109 as the temperature varies.
OFF/ON—indicates the entire HVAC equipment 109 system is respectively turned off or for programming steps. (These indicators are displayed only by operation of the thermostat control program upon receipt and storage of signals from ECP 104 that one or more of the equipment operating modes is active and therefore will be displayed for local viewing)

Clock with Day of the Week 13: Indicates the current time and day. This clock is also used to program the time periods.

Room Temperature Display 14: Indicates the current room temperature.

Desired Set Temperature 15: Indicates desired room temperature(s).

Override Indication 16: Indicates the current program is currently being overridden for up to 4 hours (a pushbutton is provided in the input/output unit of thermostat 106 indicating "override", whereby when the thermostat control program detects that said button has been depressed, transmits to the ECP 106 control information for HVAC equipment such as temperature setpoints which replace the control information currently required for operation by remote input. The displaced control information is stored and replaces the override control information from the thermostat after a pre-determined time, preferably for one half hour or less.

Occupied or Unoccupied Indication 17 indicates the program number: Occupied 1, 2, 3 or Unoccupied.

Setup Indication 18: Indicates the Thermostat is in the programming mode.

Fan Operation Indication 19: The fan icon indicates constant, continuous fan operation. When the fan icon is not lit, it indicates the fan will only operate when necessary to heat or to cool.

Service Filter Indication 20: Service Filter indicates when the filter should be serviced under normal conditions. Appears after a predetermined number of hours (preferably 0-1950 hours) of blower or fan operation. Service along with a blank screen indicates that the Equipment Control Pac has been disconnected or is no longer operational so the viewer knows that the local thermostat controls local HVAC functions.

Locked Indication 21: A lock icon appears after the right combination of buttons are pressed, rendering the buttons inoperative.

Start/Stop Indication 22: Start or Stop appears when programming timer functions.

Percent and Degree Indication 23: % appears when air mixture, indoor humidity, or outdoor humidity is being displayed. Appears when temperature is being displayed. Will also blink when the Thermostat is operating without a Data Concentrator.

Outside Air or Outside Indication 24: Outside Air or Outside appears when Air Mixture, Outdoor Air Temperature, or outside Humidity is being displayed.

The engineering to create a programmable thermostat with push button and liquid crystal display interface as described above is within skill in the art upon disclosure of the present specification and drawings.

It is well known that electrical power utilities currently reward commercial building and facilities customers with rebates or reductions in power costs for being able to monitor and record power usage at these facilities, especially with regard to environmental control equipment and lighting that are common to most such facilities. It is well known that such utilities have installed and operated systems to be able to control heating and cooling setpoints for operation of their customers' HVAC equipment with their customers' agreement to such control at critical times of peak power demands on the utilities' systems. The present invention provides for sensing of temperatures and lighting levels within and around the property of multiple locations 100. Temperature sensors are located at least inside the environmental controlled space of a retail store structure in environment control zones and more preferably also outside that structure and at critical locations on the HVAC equipment as described above. The electrical signals of these temperature sensors are sent by wire or wireless connection to an ECP 104 for storage and transmission to data concentrator 103, where such signals are transmitted to server 120 for storage and use by the central control program operating on server 120.

Light level sensors are located at critical locations for operation of lighting zones established at locations 100. Such zones include lights arranged to light a particular zone at location 100 where employee or customer typically require lighting at above a pre-determined level. Light level sensors in one zone embodiment are directed at portions of the customer accessible spaces in structure 110 where they are controlled remotely from a central office 101 by distribution to each location 100 of control information. The electrical signals of these temperature sensors are sent by wire or wireless connection to an LSCP 115 for storage and transmission to data concentrator 103, where such signals are transmitted to server 120 for storage and use by the central control program operating on server 120.

Figure 8:
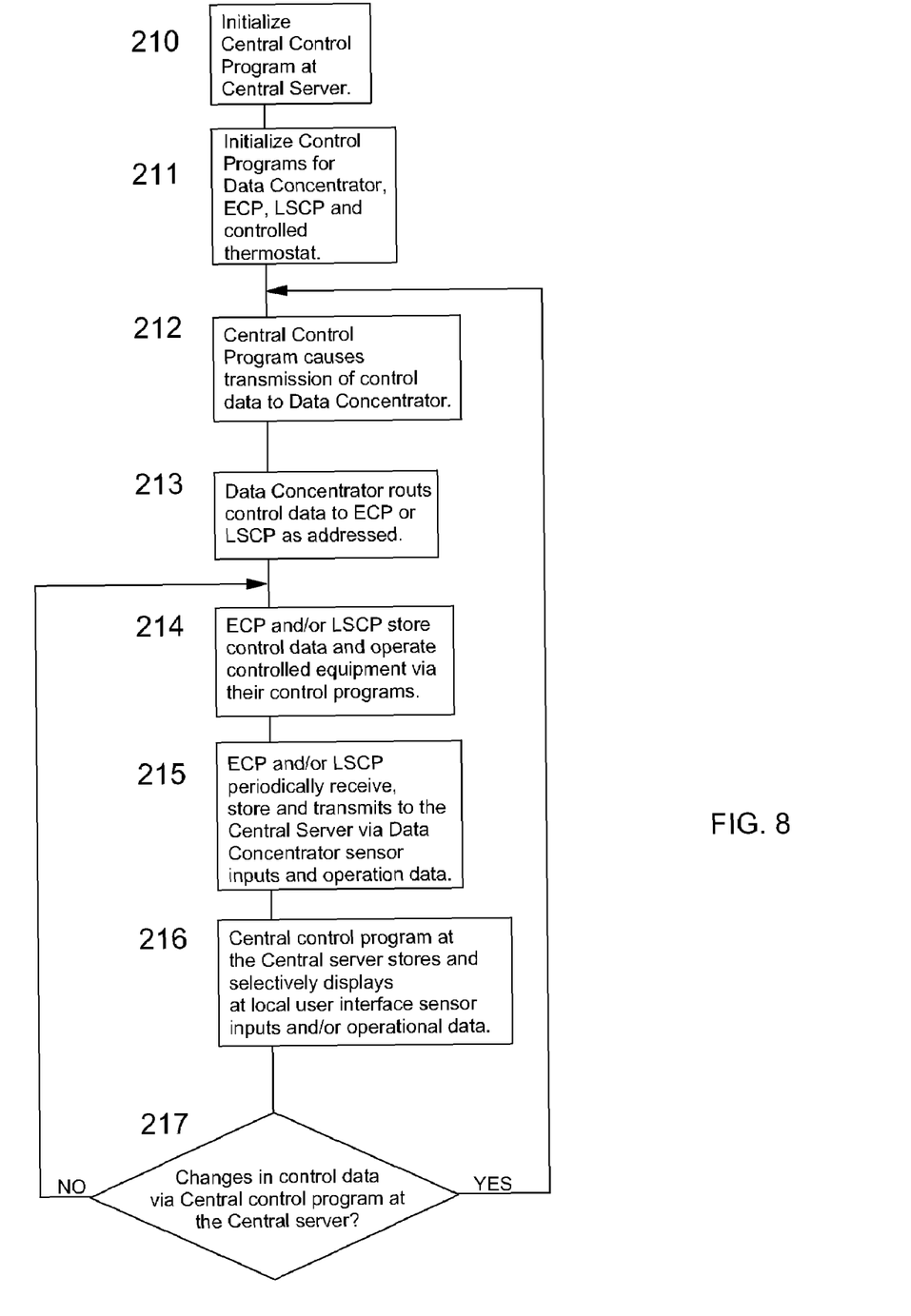
FIG. 8 is a high level flow diagram of one invention embodiment.

FIG. 8 describes a general flowchart of the operation of the invention system with reference to FIGS. 1 and 2. At step 210, a central control program initializes at central server 120 adapted to produce displays of information and receive input from a user at a user interface of a local node of server 120. The central control program operates to generate from pre-stored values or from inputs from said user a set of control data required to operate HVAC equipment and/or lighting at location 100. Said control data include at least setpoints for activation of heating, ventilation or cooling equipment which operate in an ECP control program in an ECP 104. In general, said setpoints are compared with environmental sensor inputs such as the temperature of conditioned space 110a and equipment is turned on or off according to known algorithms for its control. Said control data include may include setpoints for activation of one or more banks of lights at location 100 which operate in an LSCP control program in an LSCP 115. In general, said setpoints are compared with lighting sensor inputs such as the level of lighting of conditioned space 110a and lighting equipment is turned on or off according to lighting requirements for a specific part of location 100. Control data also includes times of day in which HVAC equipment or lighting equipment shall operate, such as signage lighting 111c or parking lot lighting 111b of FIG. 1.

Referring again to FIG. 8, at step 211 control programs are initialized each of a Data Concentrator 103, an ECP 104, an LSCP 115 and a controlled thermostat 106. At step 212, the central control program causes a transmission of control data to the data concentrator 103, which in step 213 further transmits appropriately addressed control data to either or both of an ECP 104 or LSCP 115 for storage at step 214.

At step 214, the ECP control program operates the ECP 104 structure to operate its controlled equipment, which can include HVAC equipment 109, one or more controlled thermostats 106, and/or sensors 107 and 108. The ECP 104 comprises means for receiving override signals from controlled thermostat 106 which will operate HVAC equipment for a pre-determined time, at which time control data will re-assert control functions over HVAC equipment. The ECP 104 comprises controlled thermostat control means such that if power to ECP 104 is turned off, controlled thermostat 106 comprises a controlled thermostat control program which will receive inputs from temperature sensors connected to the ECP and act to control HVAC equipment connected for operation by the ECP 104.

At step 214, the LSCP control program operates the LSCP 115 structure to operate its controlled equipment, which can include lights 111a to 111c and/or sensors 107 and 108.

At step 215, the ECP 104 and/or LSCP 115 via their control programs periodically receive, store and transmit to the data concentrator 103 the values of sensor inputs and operational data. Operational data includes lengths of time specific pieces of equipment, such as signs 111c (FIG. 1) or compressors (FIG. 6) have continuously operated at specific times and dates or cumulative periods of operation within pre-determined periods of time for calculation of energy usage by the central control program.

At step 216, sensor inputs and operational data are stored and selectively displayed by the central control program at the central server 120. Referring to FIG. 2, local nodes 121, 122 and 123 comprise user interfaces which are permitted different levels of access to displays of information from locations 100 and different levels of input to the central server 120 which changes control data. Node 121 in a specific embodiment is permitted only to generate informational displays while lacking ability to input changes to control data. Node 122 in a specific embodiment is permitted the access of node 121 while permitting changes of control data only within specific ranges, i.e., a cooling setpoint of only from 78 to 82 degrees F. may be chosen for input to the control data at the central server 120 for a specific location 100, which is then transmitted to said location 100 for operation of its air conditioning. Node 123 in a specific embodiment is permitted the access of nodes 121 and 122 while permitting changes of control data without restriction, i.e., a cooling setpoint of 90 degrees F. may be chosen for input to the control data at the central server 120 for a specific location 100, which is then transmitted to said location 100 for operation of its air conditioning.

Step 217 provides for detection of a change in control data at central server 120, which returns the central control program to step 212 for change of control data at locations 100.

A function of the central control program is now described. It has been long known that a single set of heating and cooling setpoints are not universally comfortable to a target set of customers for retail locations as described herein. Summer in a location in Houston, Tex. is typically hot and humid, as it is in Lubbock, Tex. However, desired customers for the same products or services offered at retail locations will not always require or desire the same indoor temperature for their shopping sensibilities. Often customers for hand tools in an upscale part of Houston will avoid a retail store whose temperature is as high as that found quite comfortable in Lubbock. Conversely, customers in Lubbock may find Houston-desirable temperatures too cool for their tastes. The present system provides means at the central control program to reduce HVAC costs and meet the needs of the customers at a retail location at the same time. A central server operated by a central control program at a remote location office 101 is often too far removed and too busy to respond to local needs of multiple locations except on some heuristic intuition of the user local at office 101. The present invention system provides for a systematic comfort and energy saving approach to this problem.

At nodes 122 or 123, a user inputs to control data to the central server 120 in one embodiment comprising heating and cooling setpoints to one or more locations 100 for operation of heating and cooling equipment. At an initial input stage, a user chooses control data setpoints based on generally accepted averages of comfort for all persons, i.e., about 78 degrees F. for cooling and 75 degrees F. for heating. At pre-determined periods, the central control program increases the setpoint for cooling and/or decreases the setpoint for heating in the control data by one degree.

The central control program operates at nodes 122 or 123 so that a user may receive a report of or input a report of customer complaints of the conditioned space of a location 100 being too hot or too. The user shall input such complaints after confirmation that the complaint is received from a person most likely to be a potentially buying and local customer of a location 100. Upon input of a valid customer complaint into memory of server 120, the central control program sums customer complaints during periods of heating using a single setpoint at a single location 100 and compares that sum with a pre-determined frequency of complaints. A specific example is where one or two customer complaints are input to the central server over a two day period for a specific location 100 where a heating setpoint of 70 degrees F. has been in effect for those days and was reached by operation of the control program reducing the heating setpoint from 75 to 70 degrees F. over a pre-determined period of time, say 3 days. The central control program will automatically change the heating setpoint for that location by increasing it one degree and maintaining it there until new customer complaint inputs exceed the pre-determined frequency, at which time the central control program will increase the heating setpoint one more degree.

Alternately, one or two customer complaints are input to the central server over a two day period where a cooling setpoint of 85 degrees F. in effect for those days and was reached by operation of the control program increasing the cooling setpoint from 78 to 85 degrees F. over a pre-determined period of time, say 3 days. The central control program will automatically change the cooling setpoint for that location by increasing it one degree and maintaining it there until new customer complaint inputs exceed the pre-determined frequency, at which time the central control program will increase the heating setpoint one more degree.

After heating or cooling setpoints are reached where customer complaint frequency is below a pre-determined value at the central server for a pre-determined period of time, such as two weeks or upon input that a substantial change in weather has occurred, the central control program operates to again raise cooling setpoints or reduce heating setpoints. Clearly, the pre-determined periods may be chosen and stored with respect to each location 100 and communication with location 100 personnel to determine how quickly heating and cooling must be changed to preserve customer loyalty. However, the invention system has operated for locations 100 separated by hundreds of miles or separated by miles with very different customer demographics to save substantial amounts of energy for the corporate operator of retail store locations where customer preferences of temperature in the conditioned space changes not only with the person but also with the type of good or service being offered. For instance, an Arizona store location 100 in summer easily maintains its cooling setpoint at 85 degrees F. without customer complaint while a California location 100 for the same goods must maintain a cooling setpoint of 75 degrees F. in order to achieve an acceptable level of customer satisfaction.

Custom Logic Embodiment

The data concentrator 103 in a custom logic embodiment operates to receive and store in its memory custom logic files from server 120. Custom logic files supply functional, operational, data logging, display and transfer functions for use at a specific location. A basic control program for the data concentrator 103 need not comprise the ability to perform every permutation of available functions for what is actually installed as a very simple system. Alternately, a more complex system requires a high level of option selections. It would be inefficient and cumbersome for programming to be performed on the control program at the data concentrator 103.

In contrast, the present embodiment provides that the control program for the data concentrator 103 comprise a structure adapted to receive one or more custom data files created or stored at server 120 and assimilated into the control program of the data concentrator 103 via transfer. In a specific example, an as-installed data concentrator 103 comprises a control program which is capable of being activated when a sensed temperature equals a setpoint temperature. In order to modify this functions, an authorized user works from a computer terminal from which the user is permitted access to a custom logic file creator level at server 120. The control program of server 120 provides the user with a display of selectable and executable functions which may be transferred to data concentrator 103 via a custom logic file from server 120.

The custom logic file is thereafter transferred to the memory of the data concentrator 103 and is thereafter automatically assimilated into the control program of the data concentrator. In the specific example, an authorized user selects functions for turning on a fan at HVAC equipment 109*a* (FIG. 1) when a motion sensor at internal sensors 107 detect motion in the occupied space. The creation of other custom logic files will be apparent from the previously disclosed functions of the data concentrator 103.

In another form of the custom logic file embodiment, an authorized user is provided a display of pre-selected packages of functions into pre-programmed custom logic files. For example, a data concentrator 103 can be installed with only a communication function from itself to server 120 and the ability to receive information that equipment and electrical connections to said equipment were active, i.e., the physical equipment available for control by the data concentrator. The local installer would have no control at all over the functions of the environmental control system and all additional functions of the data concentrator would be made by way of transfer from server 120. In one instance, an authorized user may receive notification via phone, email or screen display on output from server 120 that said data concentrator 103 had been installed and will view a list of equipment available for operation and interaction with the data concentrator 103. Upon receiving such notification, the user would view a list of one or more pre-programmed custom logic files which are available for transfer to the data concentrator 103. The user would select one or more of such files and transfer them from server 120 to data concentrator 103. Pre-programmed custom logic files include standard HVAC control functions by way of a pre-selected set of setpoints. Said setpoints are pre-selected from those determined by the remote user to achieve customer comfort, reducing energy costs or other such user goals.

This embodiment also comprises a discriminator feature. In a first form of the discriminator feature, server 120 has received and stored equipment specifications and hardware capabilities of environmental control equipment at a remote location which is the site of the data concentrator 103. Only those functions are displayed to the authorized user for selection into a custom logic file that are actually capable of being available for implementation, i.e., no operation of equipment upon sensing of motion in the occupied space would be displayed unless server 120 had previously stored data from a specific location's data concentrator 103 that such a motion sensor had been installed and provided input to the data concentrator.

Report Changed Data Only Embodiment

In the report changed data only embodiment, communication or interaction traffic with the data concentrator 103 is limited to only that which has been changed since the last read time. Control programs of the data concentrator 103, server 120, and equipment control packages 104*a* and 104*b* and lighting and security control package 115 all comprise means to associate stored data with a last read and transfer time. If stored data has changed since the last read and transfer time, it is transferred to an other device memory while no transfer is made of unchanged data. The many functions accomplished by and data accumulated by the invention system operate with measurably faster response by way of this embodiment.

Modulating Economizer Control Embodiment

The modulating economizer control comprises a function of the control program of the equipment control package 104. Said function responds to input from the data concentrator 103 to open or close to its various positions a variable position damper at an economizer (FIG. 6) that is part of HVAC equipment 109. In the prior art, a separate controller device has been required to perform this function. The unique distribution of control devices in the present invention permits integration of this damper control function into the equipment control package 104. It is intended that the parameters of said function are available to an authorized user in the custom logic file embodiment for selection at server 120 for transfer to data concentrator 103, which in turn transfers said function to equipment control package 104 for assimilation into its control program.

Secondary Voltage Sensor Embodiment

In a secondary voltage sensor embodiment, secondary voltage sensor means are incorporated into the equipment control package 104 to measure periodic and cumulative power and/or periodic voltage that passes through said package 104. Package 104 provides power to the HVAC equipment 109, so that the output of the secondary voltage sensor is valuable for evaluation of the operation of the HVAC equipment 109. Output of the secondary voltage sensor is received by the ECP 104, stored thereat, and is data available via the data concentrator 103 to a user viewing displays generated by server 120. In a specific example, variations in voltage supplied to HVAC equipment 109 can indicate whether it has been exposed to excessive voltage levels, which would indicate a need for maintenance or other action.

Automatic Load Balancing Embodiment

The automatic load balancing embodiment comprises a function of the control program of the data concentrator 103. Said function operates to determine a sum operating hours (or other time units) of each of the duplicated pieces of rotating equipment among the HVAC equipment 109. For pieces of duplicated equipment, such as air conditioning compressors, a load balancing setpoint is input from server 120 to data concentrator 103 so that when cumulative hours of a first equipment piece exceeds the load balancing setpoint, the control program of the data concentrator 103 causes the first equipment piece to shut down and a second equipment piece operates in its place. The cumulative hours of the first equipment piece are reset to zero (or equivalent action). When cumulative hours of the second equipment piece exceed the load balancing setpoint, the second equipment piece is shut down and the first equipment piece operates in its place. Balancing operating loads of duplicated equipment extends the time between required instances of maintenance and replacement.

Automatic Curtailment Embodiment

The automatic curtailment embodiment comprises a curtailment function of the control program of the data concentrator 103. Said function operates upon input from server 120 comprising a cost of electrical power. Data concentrator 103 receives input from ECP 104 and LSCP 115 so that operating time and cumulative operating power of all operating equipment in the system is determined periodically and such values stored in the memory of the data concentrator 103. The curtailment setpoint is received from server 120 at data concentrator 103 or a curtailment algorithm operates to determine a curtailment setpoint. When power usage of HVAC equipment 109 exceeds the curtailment setpoint, temperature setpoints for operation of HVAC equipment 109 are increased for the cooling function and/or reduced for the heating function. Equipment usage and energy costs are reduced.

Current Transducer Embodiment

In a current transducer embodiment, the control program of the data concentrator 103 comprises a function which calculates cumulative power usage of all local equipment connected with the data concentrator 103. The value of cumulative power usage is periodically transmitted to server 120 for viewing by a user receiving displays from server 120. A cumulative power consumption for a pre-determined time period is displayed to said user showing power consumed by HVAC equipment, lighting, or overall building power. The value of cumulative energy consumption is used by the control program of server 120 to calculate energy costs, which are also displayed to said user.

Perceived Temperature Control Embodiment

In a perceived temperature control embodiment, the data concentrator 103 comprises a function in its control program to change temperature setpoints for heating and cooling operation of the invention system upon periodic calculation of a perceived temperature algorithm. The basis of the algorithm is the fact that the temperature outside the occupied space has been found to affect what is perceived to be a lowest (in the case of heating) or highest (in the case of cooling) temperature is acceptable and comfortable to a person in the occupied space. If the person in the occupied space will only be in the occupied space a short while (as in the case of a commercial customer in a retail store), the perceived comfortable temperature may be closer to the external temperature than if the person spent a longer time in the occupied space. In other words, a person temporarily perceives that a temperature is comfortable depending on the temperature of the space from which they have just come.

In a specific example, when it is very hot outside, a warmer than normal inside temperature will feel comfortable during a relatively short visit. Likewise, when it is very cold outside, the store may not need to be heated as much for a customer to feel relatively warm compared to the outside temperature. In this embodiment sensors 108 include a temperature sensor measuring the outside temperature and sensors 107 include a temperature sensor for the inside temperatures. The perceived temperature algorithm periodically calculates a difference between the inside and outside temperatures and stores that value. A portion or percentage of the temperature difference between inside and outside temperatures is calculated and that perceived changed value is added to the inside temperature to be stored as the perceived comfortable temperature value. The perceived comfortable temperature value is then made the temperature setpoint for heating or cooling operation, as appropriate to the operation selected by the control program of the data concentrator 103.

The perceived temperature algorithm may be quite simple. A pre-set percentage of the difference between inside and outside temperatures may determine perceived changed value. For example, 30 percent of said temperature difference may equal the perceived changed value. Alternately, 20 percent of said temperature difference may equal the perceived changed value for a cooling setpoint and 30 percent of said temperature difference may equal the perceived changed value for a heating setpoint. In addition, a relatively large value of said temperature difference will change the perceived changed value from 30 percent of said temperature difference to 20 percent of that temperature difference. A more sophisticated perceived temperature algorithm is also contemplated.

Batch Setpoint Changes to Lists of Locations Embodiment

A batch setpoint changes to lists of locations embodiments comprises a function of the control program of server 120. Server 120 receives from multiple locations heating and cooling setpoints used by separate data concentrators 103 at each of those locations heating and cooling setpoints used at each of those locations for control of HVAC equipment. An authorized user provided control access to server 120 views displays at a computer terminal of said current setpoints of the multiple locations. Within said single display, the user is provided with displayed means for selecting or changing any or all of said current setpoints for the multiple locations. In one example, a user may input in a text box new setpoint values at a location associated with a current setpoint value. The user is also provided with activatable means for, in a single activation action, such as clicking on an icon, transmitting the changed setpoints as a batch transmission to server 120, which in turn transmits the changed setpoints to the appropriate data concentrator 103 for which they were intended. A user need not spend time opening a single display for representations of the setpoints of each data concentrator 103 controlled via server 120.

Embodiments of Website Displays, Functions and Features

Embodiments of the invention include access to server 120 via Internet communications from a remote terminal having a display receiving and displaying web pages from server 120, whereby appropriate authorization provides the user with an interface which may accomplish all the functions of server 120 that would be available to said user at a direct network access to server 120. A user may provide input to server 120 and receive visual displays of output therefrom. Exemplary of said displays are alarm activations which occur at or are received by data concentrator 103 and transmitted to server 120, reports of system activity, operational data, and sensor inputs stored at data concentrator 103 and transmitted to server 120, instances of curtailment or modification of HVAC operation by way of changing of heating or cooling setpoints, instances of automatic clock synchronizing between server 120 and data concentrator 103, batch setpoint changes to lists of locations, and other interactive access to other functions of the control program of server 120.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

We claim:

1. A system for controlling the operation of energy consuming devices within multiple retail store locations, where at each said location is adapted to permit consumers to enter a conditioned space in an enclosed building structure to view or purchase goods or services and all said locations are owned and controlled by a single business entity, whereby each said location further comprises equipment for heating the conditioned space, equipment for cooling the conditioned space, ducts for delivery of cooled or heated air to the conditioned space, ducts for return air flow from the conditioned space to the equipment for heating or cooling the conditioned space, and a plurality of sets of lights adapted to light physical zones of said location, each set of lights being operable by a single switch, the improvement comprising:

a central server located at a central office of said business entity remote from any of said locations and comprising a first central processing unit, a first memory and a first input/output unit operating under a central control program that determines and stores in the first memory control data, whereby at least one computer node with a user interface adapted to communicate with the first input/output unit for receiving output from the first memory and transmitting input to the first memory that can change control data;

the first input/output unit further comprising wide area network communication means for transmitting control data to each of said locations and for receiving sensor data or operations data from said locations;

each of said locations further comprises a single data concentrator comprising a second central processing unit, a second memory and a second input/output unit connected for communications with the central server, one or more equipment control packs, and a lighting pack, where the data concentrator operates under a data concentrator control program stored in the second memory adapted to receive and store transmissions of control data from the central server and transmit them to one of one or more equipment control packs or to a lighting control pack according to a sorting means of the data concentrator control program that associates separable data parts of the control data with a specific equipment control pack or lighting control pack;

each equipment control pack comprises a third central processing unit, a third memory and a third input/output unit connected for communications with the data concentrator, a controlled programmable thermostat, and one or more temperature sensors as well as switches for heating equipment and cooling equipment, where each equipment control pack operates under an equipment control pack control program in the third memory adapted to receive and store transmissions of control data from the data concentrator and store control data in the third memory, such that each equipment control pack receives and stores temperature sensor signals determining current temperatures in at least a portion of the conditioned space and compares the current temperature with one or more temperature setpoints from the control data, whereafter heating equipment or cooling equipment controlled by a equipment control pack may be turned on until said current temperature is within a range of setpoints for heating or cooling of the conditioned space;

each lighting control pack comprises a fourth central processing unit, a fourth memory and a fourth input/output unit connected for communications with the data concentrator and one or more lighting level sensors arranged at said location under each of said sets of lights as well as switches for one or more sets of lights, where each lighting control pack operates under a lighting control pack control program in the fourth memory adapted to receive and store transmissions of control data from the data concentrator, such that each lighting control pack receives and stores lighting level sensor signals determining current lighting levels under each of said sets of lights, whereafter one or more sets of lights may be turned on or off by operation of the lighting control pack control program operating under the control data;

one or more controlled programmable thermostats, each comprising a fifth central processing unit, a fifth memory and a fifth input/output unit connected for communications with a single equipment control pack and a thermostat user interface for input of at least heating or cooling setpoints, where each controlled programmable thermostat operates under a thermostat control program adapted to receive and store temperature sensor signals from its communicating equipment control pack, such that each controlled programmable thermostat cannot cause a change in the operation of heating or cooling equipment controlled by its communicating equipment control pack unless a local user activates an override function of the thermostat control program via the thermostat user interface, whereafter temperature setpoints are transmitted from a controlled programmable thermostat to its equipment control pack to replace for a pre-determined period of time the temperature setpoints from control data used by the equipment control pack program and such that at the end of the pre-determined period of time the temperature setpoints of the control data replace those from the controlled programmable thermostat used by the equipment control program.

2. The system of claim 1, wherein each equipment control pack comprises circuits, circuit support boards, and input and output equipment housed in a single housing substantially sealed against the atmosphere.

3. The system of claim 2, wherein cooling equipment operable by a single equipment control package resides in a single cooling equipment housing, wherein said single equipment control package is secured.

4. The system of claim 2, wherein heating equipment operable by a single equipment control package resides in a single heating equipment housing, wherein said single equipment control package is secured.

5. The system of claim 2, wherein cooling and heating equipment operable by a single equipment control package resides in a single equipment housing, said single equipment control package is secured within the equipment housing, a supply duct connects a conditioned air outlet from the cooling and heating equipment to the conditioned space, a return duct connects a conditioned air inlet from the conditioned space to the cooling and heating equipment and temperature sensors detect and transmit to the single equipment control package temperatures of air flow in the supply duct and return duct and air flow in the supply duct.

6. The system of claim 5, wherein equipment control programs at each said location operate to, for pre-determined periods of time, calculate periods of operation of each piece of heating and cooling equipment, store temperature sensor and air flow sensor data, and calculate periods of time in which an override from controlled programmable thermostats as a package of location sensor and operations data and thereafter transmit it to the data concentrator, whereafter said location sensor and operations data is transmitted to and stored at the central server.

7. The system of claim 6, wherein the central control program operates to increase the cooling setpoint for an energy controlled location by one degree at pre-determined intervals.

8. The system of claim 7, wherein the central server receives input of one or more customer complaints from the energy controlled location that the conditioned space therein is too hot during a pre-determined cooling period.

9. The system of claim 8, wherein the central control program compares frequency of said customer complaints over a pre-determined period with a pre-set customer complaint level, whereby if the frequency of said customer complaints is greater than the pre-set customer complaint level, the central control program decreases the cooling setpoint for the energy controlled location and transmits it thereto.

10. The system of claim 9, wherein after a pre-determined period, the central control program operates to increase the cooling setpoint for the energy controlled location by one degree at pre-determined intervals.

11. The system of claim 6, wherein the central control program operates to decrease the heating setpoint for an energy controlled location by one degree at pre-determined intervals.

12. The system of claim 11, wherein the central server receives input of one or more customer complaints from the energy controlled location that the conditioned space therein is too cold during a pre-determined heating period.

13. The system of claim 12, wherein the central control program compares frequency of said customer complaints over a pre-determined period with a pre-set customer complaint level, whereby if the frequency of said customer complaints is greater than the pre-set customer complaint level, the central control program increases the heating setpoint for the energy controlled location and transmits it thereto.

14. The system of claim 13, wherein after a pre-determined period, the central control program operates to decrease the heating setpoint for the energy controlled location by one degree at pre-determined intervals.

* * * * *